United States Patent
Boctor et al.

(10) Patent No.: US 7,987,392 B2
(45) Date of Patent: Jul. 26, 2011

(54) DIFFERENTIATING CONNECTIVITY ISSUES FROM SERVER FAILURES

(75) Inventors: Victor Boctor, Redmond, WA (US); Todd Luttinen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 170 days.

(21) Appl. No.: 12/479,971

(22) Filed: Jun. 8, 2009

(65) Prior Publication Data
US 2010/0313064 A1 Dec. 9, 2010

(51) Int. Cl.
G06F 11/00 (2006.01)
(52) U.S. Cl. .......................... 714/43; 714/16
(58) Field of Classification Search ............ 714/43
See application file for complete search history.

(56) References Cited

U.S. PATENT DOCUMENTS

| | | | |
|---|---|---|---|
| 6,553,401 B1 | 4/2003 | Carter et al. | |
| 6,854,069 B2* | 2/2005 | Kampe et al. | 714/4 |
| 7,152,182 B2 | 12/2006 | Ji et al. | |
| 7,203,742 B1 | 4/2007 | Luft et al. | |
| 7,469,279 B1 | 12/2008 | Stamler et al. | |
| 2002/0007468 A1* | 1/2002 | Kampe et al. | 714/4 |
| 2006/0179150 A1* | 8/2006 | Farley et al. | 709/228 |
| 2008/0016115 A1* | 1/2008 | Bahl et al. | 707/104.1 |
| 2008/0040509 A1 | 2/2008 | Werb et al. | |
| 2008/0189353 A1 | 8/2008 | Gray et al. | |
| 2009/0271656 A1* | 10/2009 | Yokota et al. | 714/6 |
| 2009/0276657 A1* | 11/2009 | Wetmore et al. | 714/4 |
| 2009/0300171 A1* | 12/2009 | Bhame et al. | 709/224 |
| 2010/0085869 A1* | 4/2010 | Small et al. | 370/218 |
| 2010/0115341 A1* | 5/2010 | Baker et al. | 714/37 |
| 2010/0149996 A1* | 6/2010 | Sun | 370/244 |

OTHER PUBLICATIONS

"Network State Management and Failure Detection", Retrieved at<<http://technet.microsoft.com/en-us/library/cc738028.aspx>>, Updated: Jan. 21, 2005, pp. 2.
Weatherspoon, et al."Efficient Heartbeats and Repair of Softstate in Decentralized Object Location and Routing Systems", Retrieved at<<http://oceanstore.cs.berkeley.edu/publications/papers/pdf/sigops-repair.pdf>>, pp. 4.
"Improving Failover Performance for Physical Network Failures", Retrieved at<<http://e-docs.bea.com/wlcp/wlss31/configwlss/heartbeat.html#wp1084888>>, pp. 4.
Bhide, et al."Implicit Replication in a Network File Server ", Retrieved at<<http://ieeexplore.ieee.org/stamp/stamp.jsp? tp=&arnumber=138251&isnumber=3749>>, IEEE, pp. 85-90.
Vogel, et al."The Design and Architecture of the Microsoft Cluster Service", Retrieved at<<http://ieeexplore.ieee.org/stamp/stamp.jsp?tp=&arnumber=689494&isnumber=15114>>, pp. 10.

* cited by examiner

Primary Examiner — Scott T Baderman
Assistant Examiner — Kamini Patel
(74) Attorney, Agent, or Firm — Turk IP Law, LLC

(57) ABSTRACT

A status of connectivity between servers of different sites (locations) is used to infer whether a network or a server failure has occurred such that data between the servers can be routed more efficiently reducing unnecessary network traffic due to duplicate messages. Servers may be grouped based on location or other characteristics and connectivity status determined based on the communication status of individual servers and their respective groups.

19 Claims, 5 Drawing Sheets

DIFFERENTIATING CONNECTIVITY ISSUES FROM SERVER FAILURES

BACKGROUND

Message Transfer Agents (MTAs) typically receive messages, store them, and forward them to the next server(s). In such cases, multiple high availability approaches may be deployed to ensure that such messages always exist on at least two servers in order to be resilient against hardware/software failures. Thus, a redundant message may be resubmitted for subsequent delivery to the intended recipient in a high availability system when a server is determined to be unavailable.

Without a distinction between network failures and server hardware/software failures, users may receive duplicate messages and unnecessary traffic due to subsequent deliveries of redundant messages may consume valuable system resources.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to associating a status of connectivity between a server and two or more other servers to infer whether network or server failure has occurred such that data between the servers can be routed more efficiently. According to some embodiments, servers may be grouped based on location or other characteristics and connectivity status determined based on the communication status of individual servers and their respective groups.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
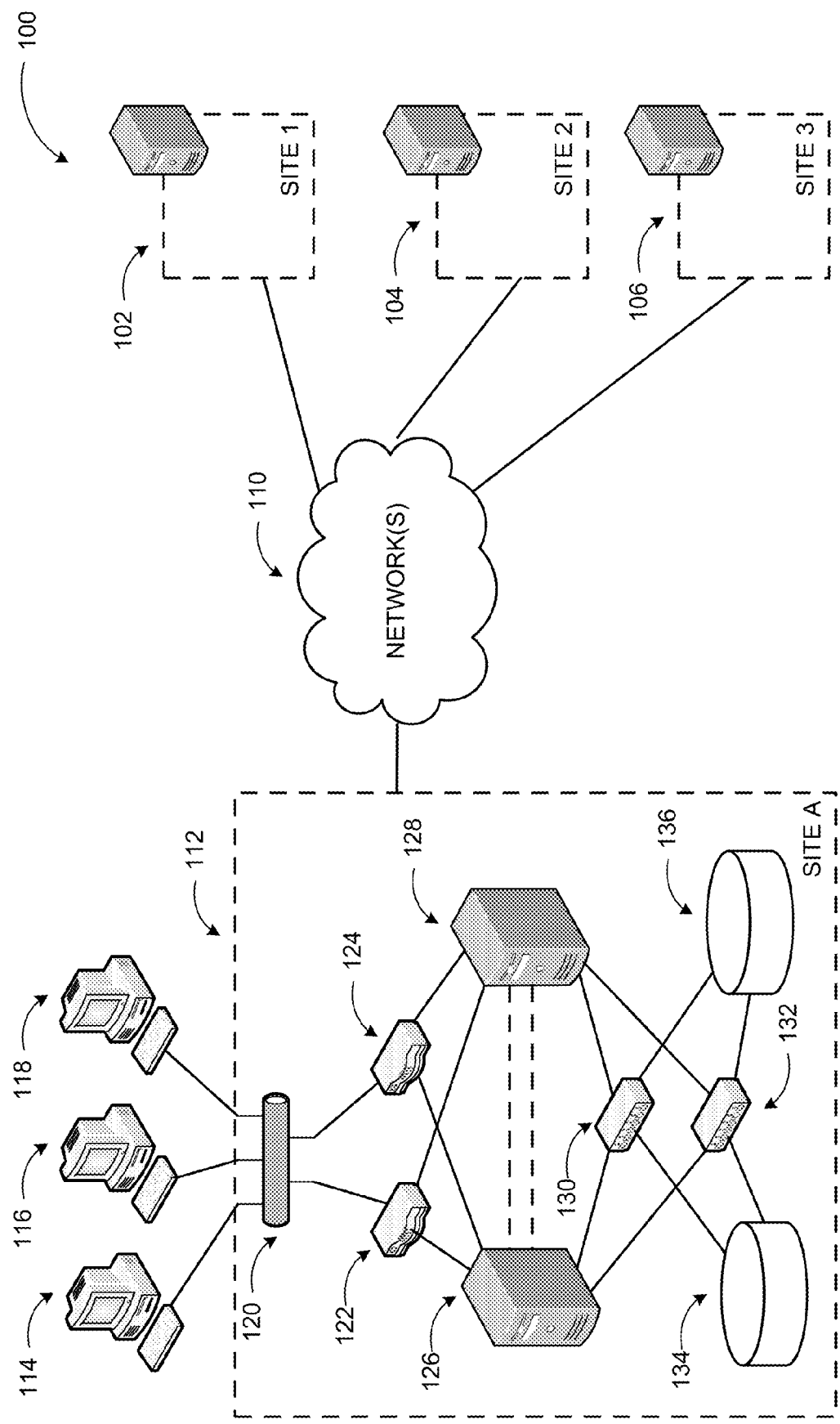
FIG. 1 is a networked environment, where a high availability system communicates with a plurality of sites or server groups.

As briefly described above, a status of connectivity between a server and two or more other servers may be associated in order to infer whether network or server failure has occurred such that data between the servers can be routed more efficiently. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "server" generally refers to a computing device executing one or more software programs typically in a networked environment. However, a server may also be implemented as a virtual server (software programs) executed on one or more computing devices viewed as a server on the network. The term "client" refers to computing devices and/or applications executed on a computing device in communication with one or more servers. More detail on these technologies and example operations is provided below.

FIG. 1 is a networked environment, where a high availability system communicates with a plurality of sites or server groups. High availability clusters are computer clusters implemented primarily for the purpose of providing high availability of services provided by the group to users' client devices 114, 116, 118 through a network connection such as network connection 120. They operate by having redundant servers or nodes 126, 128, which are used to the provide service when one or more of the system components fail. Normally, if a server executing a particular application crashes, the application becomes unavailable until the crashed server is repaired or replaced. High availability clustering remedies this situation by detecting hardware/software faults, and immediately restarting the application on another system without requiring administrative intervention, a process known as failover.

As part of the failover process, clustering software may configure the server before starting the application on it. For example, appropriate file systems may need to be imported and installed, network hardware may have to be configured, and some supporting applications may need to be initialized as well. High availability clusters are often used for critical databases, file sharing on a network, business applications, and customer services such as electronic commerce websites. High availability cluster implementations attempt to build redundancy into a cluster to eliminate single points of failure, including multiple network connections through network routers 122, 124, data storage 134, 136, which may be multiply connected via storage area network managers 130, 132.

High availability clusters may employ a heartbeat private network connection to monitor the health and status of each node in the cluster. In a system providing a multitude of services through various locations, high availability clusters may be segmented as sites such as site A (112) shown in diagram 100. These sites may communicate with each other and other sites belonging to other systems such as site 1 (102), site 2 (104), and site 3 (106) through a variety of networks 110.

A platform providing services with high availability may be implemented via software executed over many servers such as a hosted service. The platform may communicate with client applications on individual computing devices through network(s) 110. The platform may also employ a number of specialized devices/applications such as routers, firewalls, and similar ones. Network(s) 110 may comprise any topology of servers, clients, Internet service providers, and communication media. A system according to embodiments may have a static or dynamic topology. Network(s) 110 may include a secure network such as an enterprise network, an unsecure network such as a wireless open network, or the Internet. Network(s) 110 may also coordinate communication over other networks such as Wide Area Networks (WANs), Local Area Networks (LANs), cellular networks, and comparable ones. Network(s) 110 provides communication between the nodes described herein. By way of example, and not limitation, network(s) 110 may include wireless media such as acoustic, RF, infrared and other wireless media.

One of the example implementations of high availability clusters is in redundancy systems. When combined with complex network topologies, redundancy protocols have some limitations. For example, they require that a redundancy server retrieve discard status from a primary server on a more frequent basis to minimize the number of "stale" messages that are resubmitted when the primary server is considered "down". In this context, "stale" messages are those messages in a redundancy queue because discard status has not been received for a message that has already been fully delivered by the primary server.

Moreover, redundancy systems commonly do not distinguish a network failure from a server failure, leading to cases where messages are resubmitted for delivery even though the original message has not been lost. Furthermore, such systems are not optimized for WAN topologies, where delivery of messages over Simple Mail Transfer Protocol (SMTP) take longer and at higher cost that deliver of LAN topologies.

Thus, in a conventional system, when a message is created on a redundancy server, it is retained until discard status is received from the primary server. Since the discard event is not persisted on the primary server, it can be lost because of service restart or termination due to unhandled exception before the redundancy server is able to retrieve discard status for a message previously delivered by the primary server. Since the discard status is not provided in this case, messages are discarded after a predefined time span. The loss of discard status can result in resubmission of larger message queues after the heartbeat fails due to server or network failure. The impact of lost discard status is compounded when the discard status is not retrieved by the redundancy server from the primary server for long periods of time. Since messages take longer to deliver over lower bandwidth networks, the interval between retrieval of discard status can increase and the window for losing discard status on the primary server increases.

If a network failure occurs between branch office and hub/datacenter location, messages are resubmitted (because the primary server is thought to be "down") and the duplicate messages are delivered after the network is restored. Since many messaging systems do not detect duplicate message delivery, recipients may actually receive duplicate messages after a network failure occurs. This may causes significant customer dissatisfaction.

If a network failure occurs between sites containing hub transport servers, potentially large numbers of messages between the hub servers in these sites may be resubmitted and delivered after the network is restored. Since remote sites can be connected over limited WAN bandwidth, the mean time to restore delivery latency service levels are likely to be extended because of additional data that will be unnecessarily queued due to message resubmission.

Figure 2:
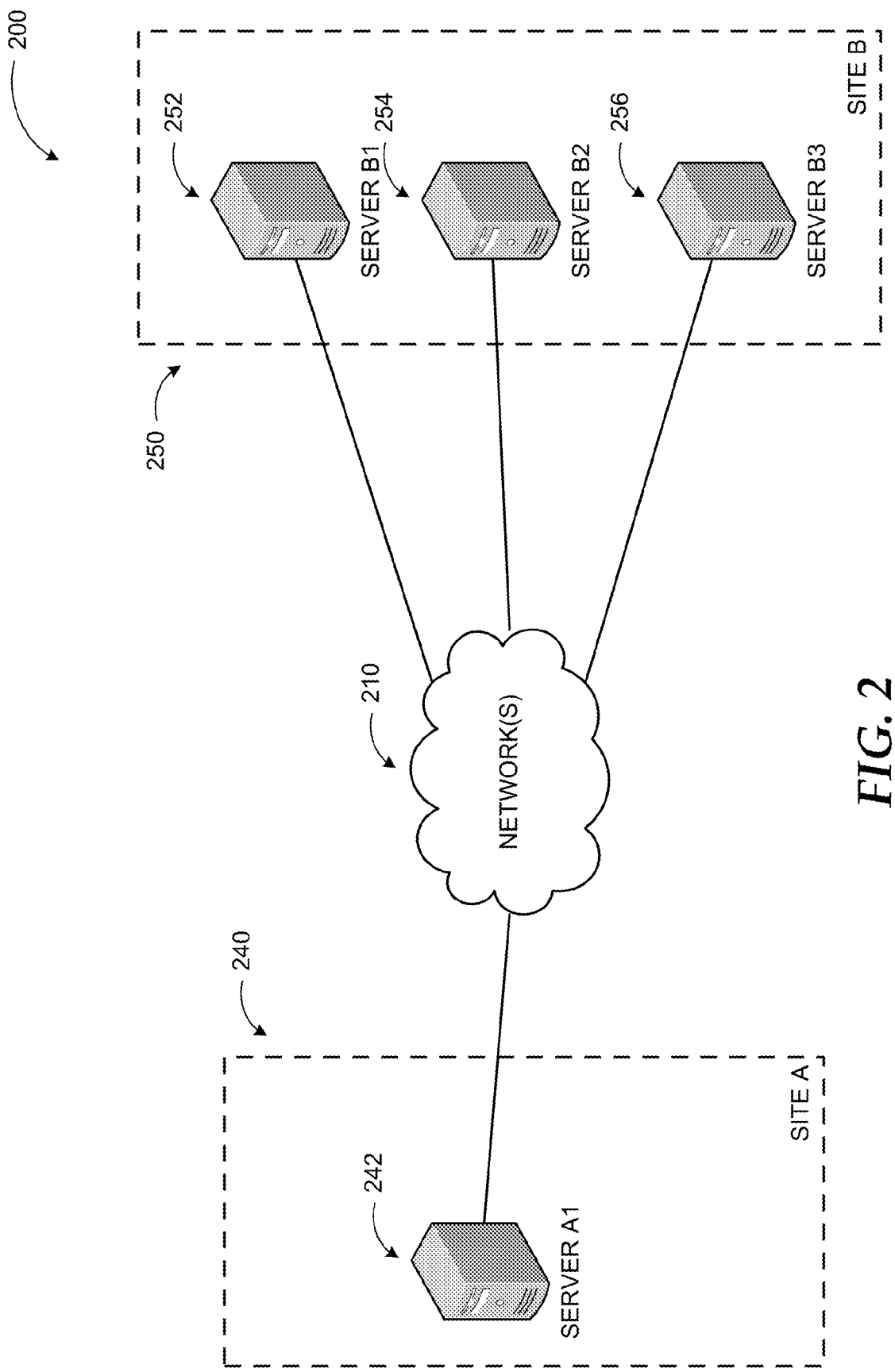
FIG. 2 is a conceptual diagram illustrating differentiation between server failure and network failure in a basic system of two sites according to one embodiment.

FIG. 2 is a conceptual diagram illustrating differentiation between server failure and network failure in a basic system of two sites according to one embodiment. Sites A and B (240, 250) in diagram 200 are examples of high availability server groupings. Such groupings of well connected servers at the same location—site—may be based on server locations, service type, a segmentation of the system, or other comparable attributes. For illustration purposes, site A (240) is shown with one server 242 that may be acting as a Message Transfer Agent (MTA).

In the example system depicted in diagram 200, servers A1, B1, B2, and B3 (242, 252, 254, and 256) are connected to a common network 210. Server A1 (242) is located at site A (240) and servers B1, B2, and B3 (252, 254, and 256) are located at site B (250). Server A1 (242) can communicate with servers B1, B2, and B3 (252, 254, and 256) on a periodic interval using a heartbeat signal. Based on how many servers server A1 (242) can communicate with, it can determine how much network connectivity exists. When an individual server is not reachable, server A1 (242) can assume that it has failed or that the network connection to that server has failed. If at least one server at site 2 (250) is reachable, server A1 (242) knows that it can communicate with resources located at site 2 (250) and can infer that the other servers have failed or that the network connections to these servers has failed. If all servers are unreachable, server A1 (242) knows that all servers at site 2 (250) are unreachable.

When applied to servers that act as MTA's, this approach may be used to determine whether individual servers are down for the purposes of high availability and redundancy. When a message transferred from server A1 to server B1 using redundancy, server A1 can differentiate a network failure (where servers B1, B2 and B3 are all unreachable) from a single server failure (where server B1 is unreachable).

Thus, in an example system according to embodiments, the explicit heartbeat signal used in high availability transport may consider a hub or edge server in a remote site as "down" when other MTAs in the same remote site are reachable. If all servers are unreachable, there is no alternate route available for a message and the message resubmission can be suppressed or delayed to reduce unnecessary traffic.

In a redundancy system, redundancy messages may not be resubmitted from the redundancy queues if a next hop solution used for delivery of the primary message does not involve multiple servers, unless a state change has been detected for the primary server in the path (indicating queue database has been recreated). Messages may be resubmitted from the redundancy queues if the next hop solution used for delivery of the primary message involves multiple servers and at least one of these servers has not failed a heartbeat. Thus, a maximum number of messages sent over an SMTP session in a WAN high availability system is limited, resulting in better load balancing and reduction of the number of outstanding messages in the redundancy queues.

Figure 3:
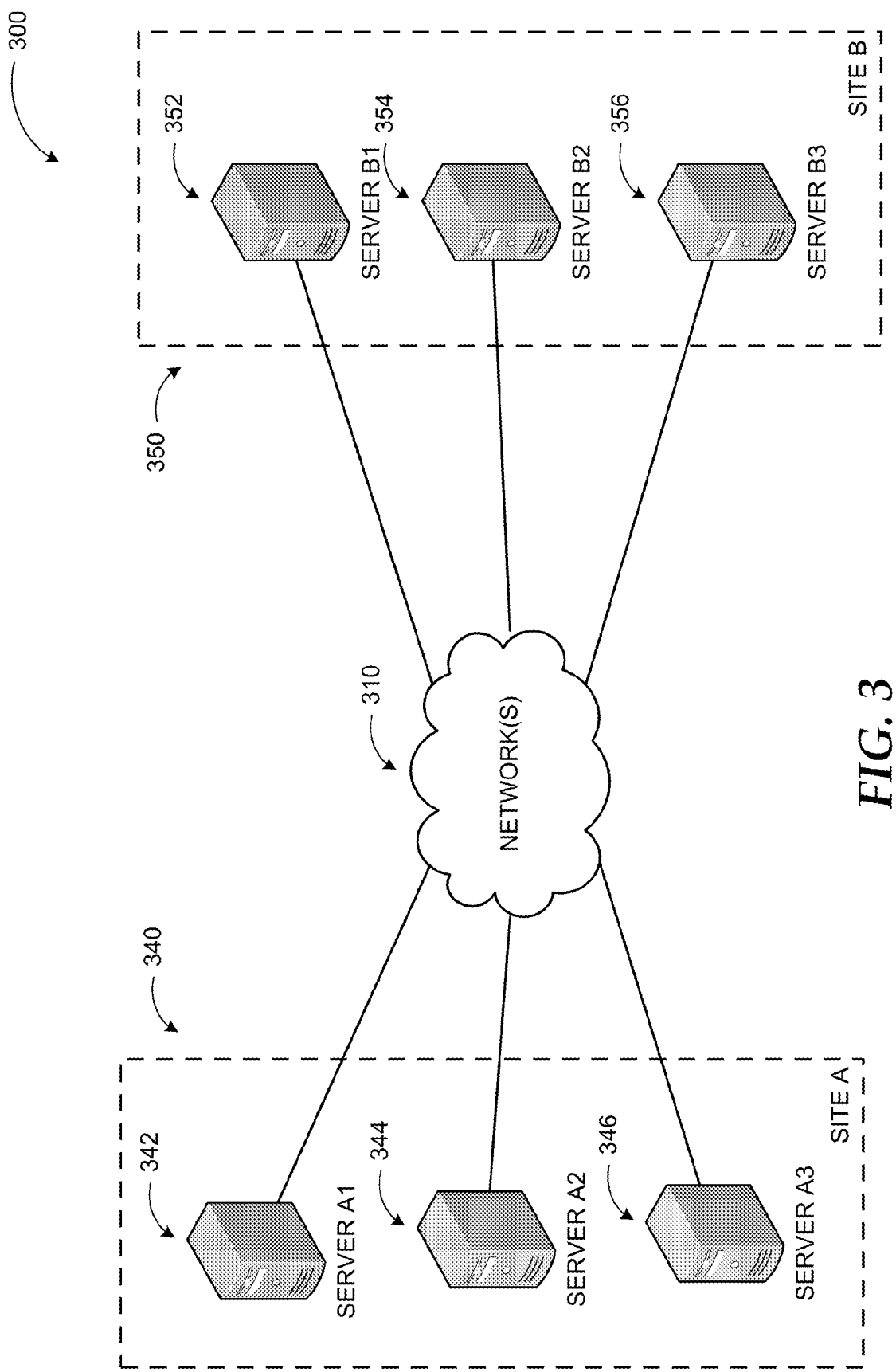
FIG. 3 is another conceptual diagram illustrating differentiation between server failure and network failure in another basic system of two sites with multiple servers according to a further embodiment.

FIG. 3 is another conceptual diagram illustrating differentiation between server failure and network failure in another basic system of two sites with multiple servers according to a further embodiment. Systems differentiating between network failures and server failures according to embodiments may include multiple sites of multiple servers communicating with each other such as sites A and B (340, 350) shown in diagram 300.

High availability sites A and B (340, 350) includes servers A1, A2, A3 (342, 344, 346) and B1, B2, B3 (352, 354, 356), respectively. When a communication interruption is detected with site B (350), an inference may be made as to whether the failure is a network failure (e.g. a WAN failure or a power failure) or a single server failure and appropriate actions taken regarding resubmitting of messages.

At site A (340), a similar detection and inference process may be employed among servers A1, A2, A3 (342, 344, 346) such that if one of the servers is down, the others may take over that server's tasks, receive messages directed to that server, etc. It should be noted, a location of the network failure is irrelevant to the servers. Regardless of whether site A or site B is the one unable to communicate with the network, the servers of either site—upon detecting network failure—may begin queuing messages intended for the other site.

According to an example scenario, a primary server may not respond to another server's explicit heartbeat and a single server exist in the other server's next hop solution. In this case, the messages are resubmitted if primary server recovers with new queue identity. The new queue identity indicates that messages associated with the old queue identity should be resubmitted if discard status has not been previously received. Alternatively, messages may be resubmitted if a new server is added to the next hop solution before the next explicit heartbeat failure occurs.

According to another example scenario, a primary server may not respond to another server's explicit heartbeat and multiple servers exist in the other server's next hop solution. In this case, the messages may be resubmitted if the primary server recovers with new queue identity before explicit heartbeat retry count exceeds a predefined heartbeat retry value. The messages may also be resubmitted when any one of the servers in next hop solution is considered "active" (explicit heartbeat failure count for alternate primary server is zero) and explicit heartbeat retry count exceeds the predefined heartbeat retry value.

Alternatively, the messages may be suppressed when all servers in next hop solution are considered "down" (explicit heartbeat failure count for all servers in next hop solution is greater than zero), even after explicit heartbeat retry count exceeds the predefined heartbeat retry value. If network failure caused all explicit heartbeat failures to occur, the messages are not resubmitted after successful explicit heartbeat unless queue identity changes.

While the example systems in FIG. 1 through FIG. 3 have been described with specific components and configurations, embodiments are not limited to these components or system configurations and can be implemented with other system configuration employing fewer or additional components. Furthermore, the networked environments discussed above are for illustration purposes only. Embodiments are not limited to the example applications, modules, or processes.

Figure 4:
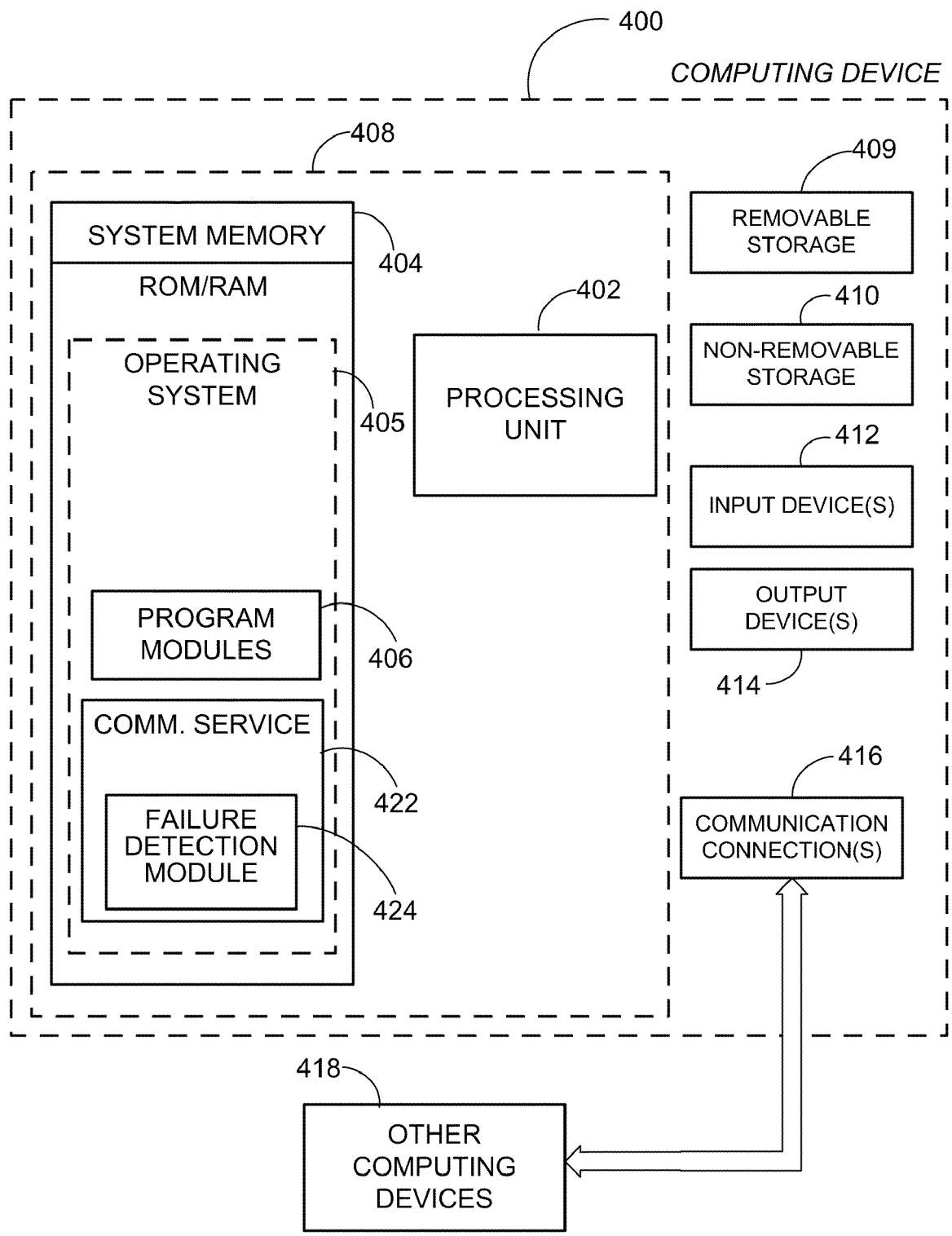
FIG. 4 is a block diagram of an example computing operating environment, where embodiments may be implemented.

FIG. 4 and the associated discussion are intended to provide a brief, general description of a suitable computing environment in which embodiments may be implemented. With reference to FIG. 4, a block diagram of an example computing operating environment for an application according to embodiments is illustrated, such as computing device 400. In a basic configuration, computing device 400 may be a server in communication with a high availability server cluster and include at least one processing unit 402 and system memory 404. Computing device 400 may also include a plurality of processing units that cooperate in executing programs. Depending on the exact configuration and type of computing device, the system memory 404 may be volatile (such as RAM), non-volatile (such as ROM, flash memory, etc.) or some combination of the two. System memory 404 typically includes an operating system 405 suitable for controlling the operation of the platform, such as the WINDOWS® operating systems from MICROSOFT CORPORATION of Redmond, Wash. The system memory 404 may also include one or more software applications such as program modules 406, communication service 422, and failure detection module 424.

Communication service 422 may be any application that facilitates communication between computing device 400 and other computing devices such as servers of a cluster, servers of other clusters, and the like. The communication may include exchange of any form of data such as redundancy messages, and similar data. Failure detection module 424 may associate a status of connectivity between computing devices to infer whether network or server failure has occurred. This inference can then be used in a number of different applications that are attempting to route data to one or more servers in a more efficient manner. This basic configuration is illustrated in FIG. 4 by those components within dashed line 408.

Computing device 400 may have additional features or functionality. For example, the computing device 400 may also include additional data storage devices (removable and/or non-removable) such as, for example, magnetic disks, optical disks, or tape. Such additional storage is illustrated in FIG. 4 by removable storage 409 and non-removable storage 410. Computer readable storage media may include volatile and nonvolatile, removable and non-removable media implemented in any method or technology for storage of information, such as computer readable instructions, data structures, program modules, or other data. System memory 404, removable storage 409 and non-removable storage 410 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer readable storage media may be part of computing device 400. Computing device 400 may also have input device(s) 412 such as keyboard, mouse, pen, voice input device, touch input device, and comparable input devices. Output device(s) 414 such as a display, speakers, printer, and other types of output devices may also be included. These devices are well known in the art and need not be discussed at length here.

Computing device 400 may also contain communication connections 416 that allow the device to communicate with other devices 418, such as over a wireless network in a distributed computing environment, a satellite link, a cellular link, and comparable mechanisms. Other devices 418 may include servers and comparable devices. Communication connection(s) 416 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 5:
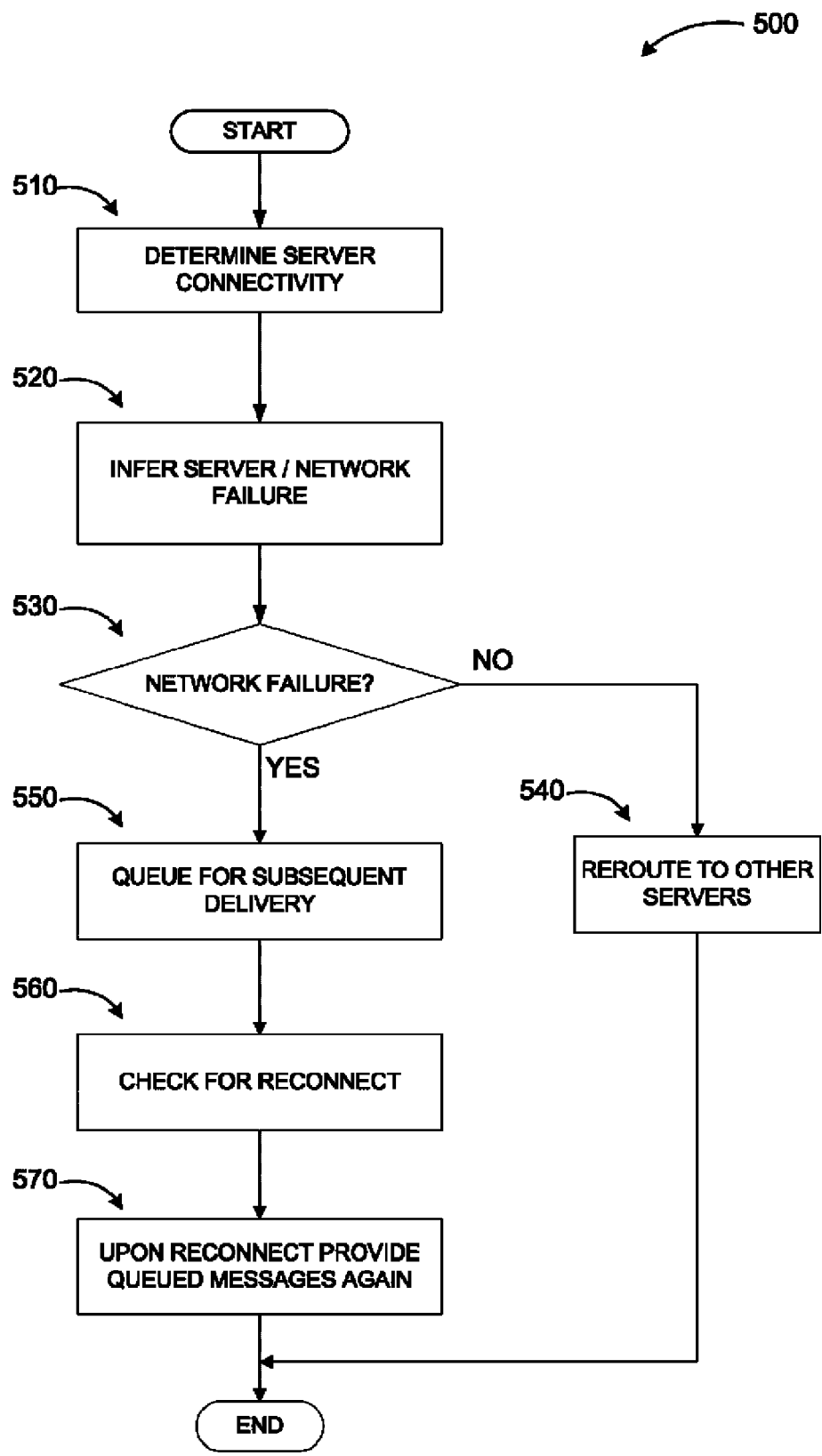
FIG. 5 illustrates a logic flow diagram for example process of performing actions in response to determining a type of connectivity problem between servers according to embodiments.

FIG. 5 illustrates a logic flow diagram for example process 500 of performing actions in response to determining a type of connectivity problem between servers according to embodiments. Process 500 may be implemented in high availability or other systems.

Process 500 begins with operation 510, where a server connectivity for a particular site is determined. This may be performed based on number of checks, period of non-response, and the like. The periods or checks may be dynamically adjusted based on network conditions, data amount to be exchanged, and so on.

At operation 520, an inference is made based on the determination of operation 510, whether a detected failure is a server failure or a network failure. Network failure may include a communication based failure or a power failure that causes disconnect with a whole site. If the failure is determined not to be a network failure at decision operation 530, the messages intended for the server—that is down—are rerouted to other servers of the same site at operation 540.

If the failure is a network failure, the messages for the site are queued for subsequent delivery at operation 550 and the site checked for reconnect at subsequent operation 560. The check for reconnect is similar to the determination of server connectivity of operation 510. The determination may also include additional steps like determining whether the server(s) is (are) powering up, ready to receive data, and so on. Upon establishing connection with the site again at operation 570, the queued messages may be submitted to the site, reducing unnecessary traffic of duplicate messages.

The operations included in process 500 are for illustration purposes. Differentiating connectivity issues from transport server failures may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for differentiating connectivity issues from server failures, the method comprising:
   determining an interruption in a connectivity status of a server of a server group;
   determining connectivity status of at least one other server within the same server group;
   inferring one of a server failure and a network failure based on the connectivity statuses of the servers in the server group; and
   routing messages to the server based on the inference by
   suppressing resubmission of redundant messages until a decision is made whether the inference is one of a server failure and a network failure;
   re-routing messages intended for the server to the at least one other server if the inference is server failure; and
   queuing the messages for later delivery if the inference is network failure.

2. The method of claim 1, further comprising:
   determining whether the server is reconnected; and
   if the server is reconnected, continuing to route the messages intended for the server to the server.

3. The method of claim 1, wherein determining whether the server is reconnected includes determining at least one of: whether the server is powering up, whether the server has lost its state, and whether the server is ready to receive data.

4. The method of claim 1, wherein the connectivity status of the server and of the at least one other server is determined based on a heartbeat network connection.

5. The method of claim 1, wherein the connectivity status of the server and of the at least one other server is determined based on one of: a number of heartbeat checks and a period of no-response.

6. The method of claim 5, wherein the number of heartbeat checks and the period of no-response are dynamically adjusted based on one from a set of: a network condition and a data amount to be transferred.

7. The method of claim 1, wherein the group of servers is grouped based on one of: a location of the servers and a function of the servers.

8. The method of claim 7, wherein the system is a high availability redundancy system for managing one of: a critical database, a file sharing network, a business application, and customer service.

9. The method of claim 1, wherein the connectivity status of the server is determined based on knowledge from at least one server in another group of servers attempting to communicate with the server.

10. The method of claim 1, wherein the network failure includes one of: a power failure and a network communication failure.

11. A computing system for differentiating connectivity issues from server failures, the system comprising:

a first site comprising a plurality of servers grouped based on one of: a location of the servers and a function of the servers;

a first server part of a second site comprising a plurality of servers coupled to the servers of the first site via a network, the first server configured to:

detect an interruption in a connectivity status of a server of the first site based on a heartbeat network connection;

determine connectivity status of remaining servers of the first site;

infer one of a server failure and a network failure based on the connectivity statuses of the servers of the first site;

suppress resubmission of redundant messages until a decision is made whether the inference is one of a server failure and a network failure;

re-route messages intended for the server to at least one the remaining servers of the first site if the inference is server failure; and queue the messages at the first server for later delivery if the inference is network failure.

12. The system of claim 11, wherein the inference is made based on knowledge associated with the first site received by the first server from remaining servers of the second site.

13. The system of claim 11, wherein the system is a high availability redundancy system exchanging redundancy messages and the first server is further configured to:

the redundancy messages are not resubmitted from redundancy queues maintained by the first server if a next hop solution for delivery of a primary message does not involve multiple servers and a state change has not been detected for the server.

14. The system of claim 13, wherein the redundancy messages are resubmitted from the redundancy queues maintained by the first server if a next hop solution for delivery of the primary message does involve multiple servers and at least one of the multiple servers has not failed a heartbeat check.

15. The system of claim 11, wherein another one of the plurality of servers of the second site is delegated tasks and operations of the first server in response to the first server becoming disconnected.

16. A computer-readable storage medium with instructions stored thereon for differentiating connectivity issues from server failures, the instructions comprising:

detecting an interruption in a connectivity status of a primary server of a site comprising a plurality of high availability servers based on one of: a number of heartbeat checks and a period of no-response;

determining connectivity status of remaining servers of the site;

inferring one of a server failure and a network failure based on the connectivity statuses of the servers of the site;

re-routing the messages intended for the primary server to at least one the remaining servers of the site if the inference is server failure;

queuing the messages for later delivery if the inference is network failure;

checking to determine whether the primary server is reconnected; and if the primary server is reconnected, continuing to route the messages intended for the primary server to the primary server.

17. The computer-readable medium of claim 16, wherein a single server exists in a next hop solution and the instructions further comprise:

resubmitting the messages in response to one of: the primary server recovering with a new queue identity and a new server being added to the next hop solution before a next explicit heartbeat failure occurs.

18. The computer-readable medium of claim 16, wherein a plurality of servers exists in a next hop solution and the instructions further comprise:

resubmitting the messages in response to one of: the primary server recovering with a new queue identity prior to an explicit heartbeat retry count exceeding a predefined heartbeat retry value and one of the servers in the next hop solution being considered active.

19. The computer-readable medium of claim 18, wherein the instructions further comprise:

suppressing the messages when all servers in the next hop solution are considered down following the explicit heartbeat retry count exceeding the predefined heartbeat retry value.

* * * * *